United States Patent [19]
Wickins

[11] Patent Number: 5,580,449
[45] Date of Patent: Dec. 3, 1996

[54] SEWAGE TREATMENT APPARATUS

[76] Inventor: Jeremy Wickins, Blackstone Cottage, 41 Leylands Road, Burgess Hill, Sussex RH15 8AF, United Kingdom

[21] Appl. No.: 284,479

[22] PCT Filed: Feb. 5, 1993

[86] PCT No.: PCT/GB93/00248

§ 371 Date: Aug. 3, 1994

§ 102(e) Date: Aug. 3, 1994

[87] PCT Pub. No.: WO93/16006

PCT Pub. Date: Aug. 19, 1993

[30] Foreign Application Priority Data

Feb. 6, 1992 [GB] United Kingdom ............... 9202540
Aug. 28, 1992 [GB] United Kingdom ............... 9218332

[51] Int. Cl.[6] .................................................. C02F 3/20
[52] U.S. Cl. .................. 210/220; 210/236; 210/238; 210/195.4
[58] Field of Search ............... 210/195.3, 195.4, 210/220, 221.2, 236, 238; 248/300, 637, 669

[56] References Cited

U.S. PATENT DOCUMENTS

| | | | |
|---|---|---|---|
| 2,996,189 | 8/1961 | Salterbach | 210/236 |
| 3,618,779 | 11/1971 | Goodman | 210/195.4 |
| 3,627,135 | 12/1971 | Goodman | 210/195.4 |
| 3,741,393 | 6/1973 | Estes et al. | 210/221.2 |
| 3,744,637 | 7/1973 | Ziegler | 210/195.4 |
| 3,805,957 | 4/1974 | Oldham et al. | 210/220 |
| 4,021,347 | 5/1977 | Teller et al. | 210/220 |
| 4,505,813 | 3/1985 | Graves | 210/221.2 |
| 4,671,872 | 6/1987 | Cramer et al. | 210/238 |

*Primary Examiner*—Christopher Upton
*Attorney, Agent, or Firm*—Dorn, McEachran, Jambor & Keating

[57] ABSTRACT

Sewage treatment apparatus comprising a tank, aeration means which serve to aerate a biomass contained within the tank when the apparatus is in use, and air compressor means which are connected to the aeration means to deliver air thereto, in which the air compressor means are in a housing that forms a barrier between the housing interior and the tank interior, to inhibit transfer of gas or other material from the tank interior to the housing interior. Also sewage treatment apparatus comprising at least two tanks each containing a biomass of treated sewage material when in use, duct means connected to respective influent inlets of those tanks, influent control means of the duct means constructed to cause sewage to pass to one of the tanks to the exclusion of the other throughout a period during which the amount of sewage received by the apparatus over a given amount of time is below a predetermined limit, and to cause sewage to pass to the other tank or the both tanks when that amount is above that limit, and biomass transfer means connected between those tanks to pass some of the biomass from the said one of the tanks to the other at predetermined intervals at least during such a period.

7 Claims, 9 Drawing Sheets

SEWAGE TREATMENT APPARATUS

The present invention relates to sewage treatment apparatus, especially but not exclusively for the treatment of domestic sewage.

Hitherto, one construction of such apparatus, referred to as a septic tank, comprises a tank having an inlet and an outlet, and baffles through which fluid passes in order to flow from the inlet to the outlet. The baffles effect a separation between solids and liquids of the influent. The solids are broken down by micro-organisms within the tank, to create a sludge which is removed regularly by a suction tanker.

Another previously proposed construction comprises a rotary drum filter which separates solids from liquids in the influent.

In both these previously proposed forms of construction, installation costs and time are relatively high, as are the frequency, cost and time involved in subsequently servicing such apparatus. Furthermore, the reduction in the pollutants in the effluent, as compared with those contained in the influent, may be considered inadequate.

A first aspect of the present invention seeks to obviate one or more of the foregoing disadvantages.

Accordingly a first aspect of the present invention is directed to sewage treatment apparatus comprising a tank, aeration means which serve to aerate a biomass contained within the tank when the apparatus is in use, and air compressor means which are connected to the aeration means to deliver air thereto, in which the air compressor means are in a housing that forms a barrier between the housing interior and the tank interior, to inhibit transfer of gas or other material from the tank interior to the housing interior.

It is desirable for the compressor to be readily removable for servicing. To this end it may be mounted on a separate panel which itself is readily removable from the compartment. For example, the support panel may have edges which slidingly engaged formations within the compartment. These formations may be in the form of studs or other projecting portions projecting from one or more interior walls of the compartment.

The compartment itself may be provided with a servicing cover.

Furthermore the compartment itself is held within the tank, at an upper level thereof. This protects the compartment from exposure and vandalism, and stabilises its temperature.

In the event that the dimensions of the panel and the dimensions of the cover require a rotation of the panel before it is slid outwardly from the compartment, slots or recesses may be formed in an edge of the panel to enable the latter to be swung clear of such projections after the panel has been slightly raised.

Connecting lines between parts mounted on the support panel and other parts within the compartment can be ducted through an umbilical cord to enable the support panel to be removed from the compartment without those lines being disconnected.

The compartment may be so constructed that it is suspended from the rim around the opening in the top of the tank. Further, the compartment incorporates the support panel and the compressor, and possibly certain other apparatus, to create a modular unit. This enables easy installation comprising the steps of digging a hole in the ground to receive the tank, securing the tank in the hole thus dug, and subsequently lowering the compartment through the opening in the upper wall of the tank until a rim of the compartment is supported on a rim of the tank.

An electrical control unit may also be mounted on the support panel.

The present invention may be embodied in sewage treatment apparatus comprising a tank, at least one electrical-power consuming device which is in the tank and which is required for the operation of the apparatus, an electrical input to enable electrical power to be supplied to the said device, and signal generator means which are connected directly or indirectly to the said device, which are constructed to provide a signal indicative of the condition of the said device, and which are connected to the said electrical input to superimpose that signal on the electrical power supply, whereby the condition of the said device can be monitored at a position remote from the tank without the need for an inspection inside the tank.

Another problem is encountered with such apparatus, and indeed with earlier sewage treatment apparatus such as a septic tank, in that it cannot easily cope with large seasonal fluctuations in its use such as might occur, for example, in a group of holiday chalets.

An embodiment of the present invention can obviate this problem.

In this embodiment, sewage treatment apparatus comprises at least two tanks each containing a biomass of treated sewage material when in use, duct means connected to respective influent inlets of those tanks, influent control means of the duct means constructed to cause sewage to pass to one of the tanks to the exclusion of the other throughout a period during which the amount of sewage received by the apparatus over a given amount of time is below a predetermined limit, and to cause sewage to pass to the other tank or to both tanks when that amount is above that limit, and biomass transfer means connected between those tanks to pass some of the biomass from the said one of the tanks to the other at predetermined intervals at least during such a period.

The said duct-means may comprise a common pipe or passageway which extends adjacent to each tank, with the pipe or other passageway being in communication with each tank via influent control means in the form of a respective automatically operated valve.

The sewage treatment apparatus may further comprise a holding tank which receives incoming influent and to which is connected the duct means, for example such a common pipe or other passageway.

The holding tank may be provided with a level sensor, or a plurality of level sensors arranged to be triggered at different respective levels of influent in the holding tank. The or each level sensor may be connected via control circuitry to operate an associated one of the said automatically operated valves so that, when the or each level sensor is triggered, the associated valve is opened or enabled.

The sewage treatment apparatus may further comprise a concentrator in the form of a tank which receives biomass from the other tanks.

In one embodiment of the present invention, the connection of the various tanks to the concentrator may be in cascade fashion, so that the tank which is connected to feed biomass directly to the concentrator is connected to receive biomass from the other tank or one of the other tanks which contain biomass.

It will be appreciated that the tank at the upstream end of the cascade is the one that receives influent from the holding tank when the influent level therein is below the lowermost level sensor.

In sewage-treatment apparatus there may be at least two biomass-containing tanks, in which the sewage is passed to one of these tanks to the exclusion of the other throughout a period during which the amount of sewage received by the apparatus over a given amount of time is below a predetermined limit, but to the other of those tanks, or to both of those tanks when the amount of sewage exceeds that limit, and some of the biomass from the said one tank is passed to the other at predetermined intervals at least during such a period.

Examples of apparatus embodying the present invention are illustrated in the accompanying drawings in which.

Figure 1:
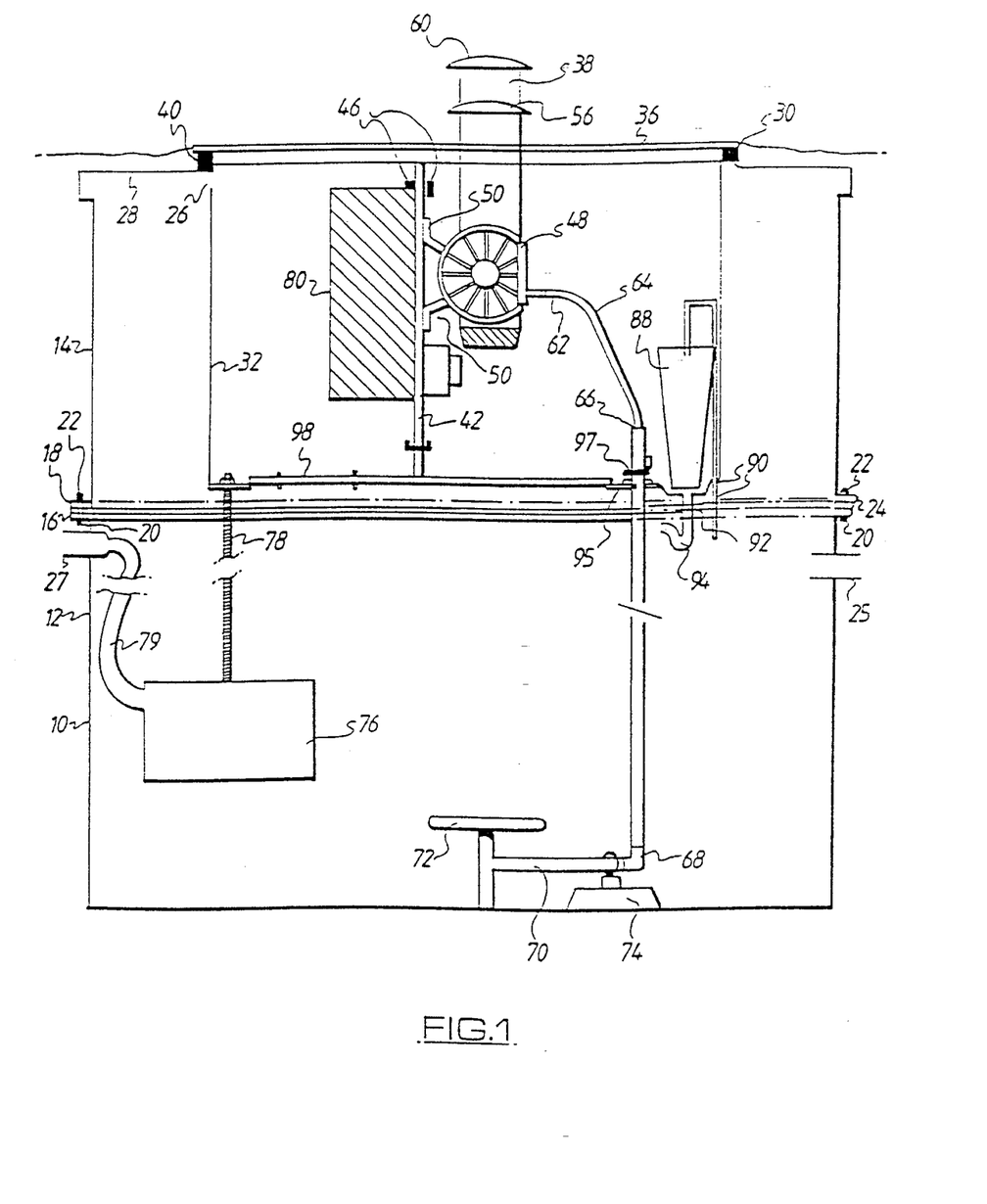
FIG. 1 shows a diagrammatic sectional elevational view of such an apparatus.
Figure 2:
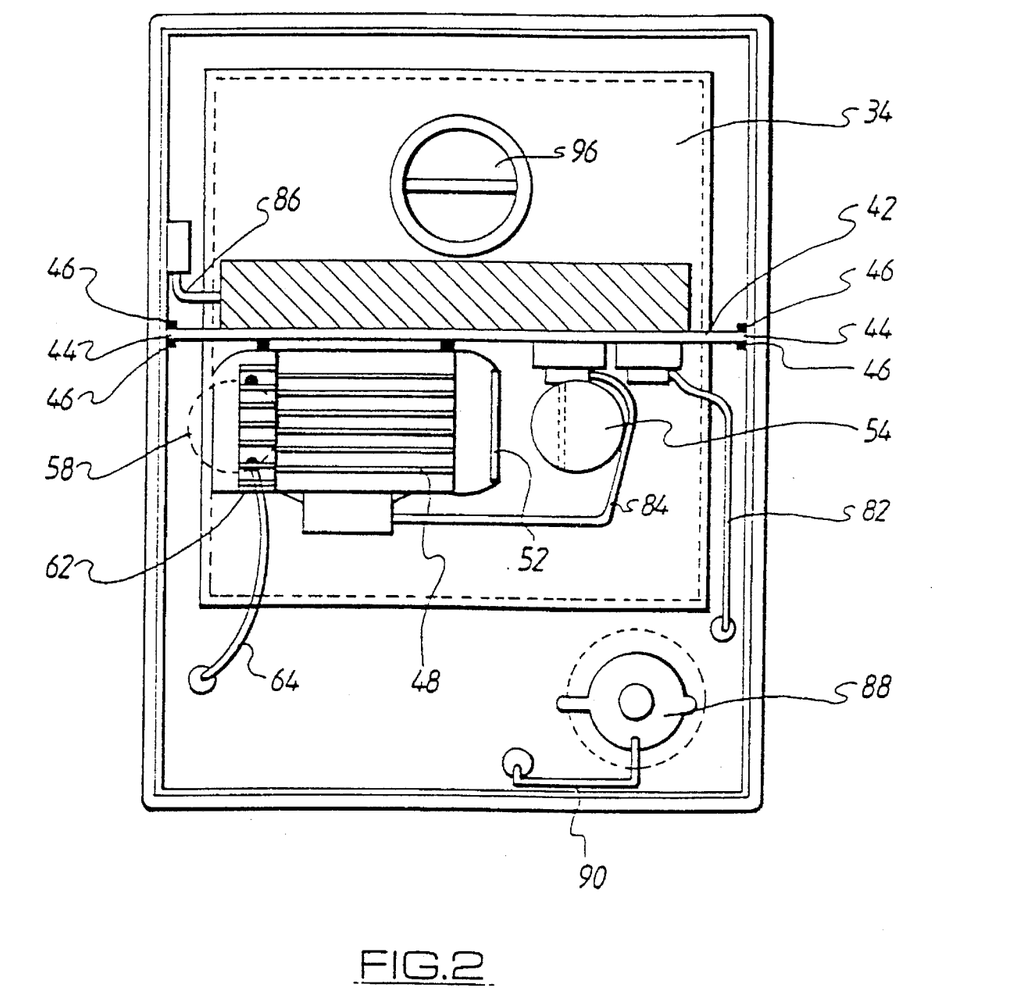
FIG. 2 shows a plan view of a modular compartment of the apparatus shown in FIG. 1.

The sewage treatment apparatus shown in FIGS. 1 and 2 comprises a plastics 4540 liter tank 10 having a lower part 12 and an upper neck part 14. These two parts 12 and 14 are provided with respective flanges 16 and 18 which are bolted together by means of nuts 20 and bolts 22 with a seal 24 sandwiched between the flanges 16 and 18.

Near the top of the lower part 12 of the tank 10, there is provided an influent inlet 25 and an effluent outlet 27.

A generally rectangular aperture 26 is cut in a top wall 28 of the tank 10, and the inner rim of the wall 28 around the aperture 26 is provided with a reinforcement 30.

A modular compartment 32 is of generally rectangular shape as viewed from above, so that it comprises four side walls, a rectangular floor 34 and a service cover 36 provided with a vent arrangement 38.

The compartment 32 is provided with a reinforced upper rim 40 which is seated on and welded to the reinforced inner rim 30 of the top wall 28 of the tank 10.

The compartment 32 is provided with a generally vertically extending support panel 42 which is slidably removable in an upward direction. Thus the panel 42 has upright edges 44 slidably located between studs 46 protruding inwardly from the side walls of the compartment 32.

A centrifugal air compressor 48 is mounted on the support panel 42 by way of brackets 50. The compressor 48 has an air intake 52 juxtaposed to a lower end of a generally vertically extending air inlet shaft 54, an upper end of which protrudes through the service cover 36 where it constitutes part of the vent arrangement 38. It is protected there by a dome 56 against ingress of rain water or other precipitation.

The rear end of the compressor 48 is juxtaposed to a lower end of an air outlet shaft 58 which also extends upwardly in a generally vertical direction through the cover 36 to constitute a second part of the vent arrangement 38, where it has its own dome 60 again to protect the shaft from the ingress of rainwater or other precipitation.

The air output 62 from the compressor 48 is connected by hosing 64 to an upper end of an air duct 66 which passes through the floor 34 of the compartment 32 downwardly to the base of the tank 10 where it is connected by an elbow joint 68 to a generally horizontal inlet passage 70 of a T-shaped fine-bubble aeration diffuser 72. The latter is held at the bottom of the tank by means of a weight 74 looped to the horizontal inlet 70.

A main effluent pump 76 is suspended by a chain 78 secured at its upper end to the floor 34 of the compartment 32. The outlet from the pump 76 is connected by ducting 79 to the effluent outlet 27 of the tank 10.

An electrical control box 80 is mounted on the support panel 42, on the opposite side thereof to the compressor 48, and is electrically connected to a mains input, the compressor 48, and the pump 76 by way of leads 82, 84 and 86 respectively.

A sampling flask 88 is also provided in the compartment 32 to enable a continuously updated sample of the effluent from the apparatus to be readily accessible. To this end, it has an input pipe 90 connected to the output from the main pump 76. The input end of the pipe 90 terminates at a position a little below the upper rim of the flask 88 to improve the extent to which effluent contained in that pipe will be syphoned back into the tank at the end of a pumping operation. The flask 88 is seated in a trough provided in the floor 34 of the compartment 32. The trough has a drain 92 terminating in an S-trap 94 to provide a barrier against return of gases from the tank to the compartment.

The duct 66 and the drain 92 extend through sealed connectors in the floor of the compartment 32. The duct 66 may be secured to the floor of the compartment 32 by means of an O-ring seal 95 over which a screw clip 97 is secured. Thus the compartment 32 provides a substantially gas-tight barrier between the tank interior and the compartment interior. This prevents carbon dioxide from the tank interior being pumped by the air compressor 48 to the diffuser 72 which would result in an inadequate supply of oxygen to the biomass.

The floor 34 of the compartment 32 is removable for inspection purposes, and may itself be provided with a gas-tight inspection hatch 96.

The leads 84, 86, and the hose 64 may be routed through an umbilical cord (not shown) to enable the panel 42 to be lifted out from the compartment 32 without the need for these lines to be disconnected.

The tank 10 is provided with a breather vent (not shown) in its top wall 28.

Installation of the apparatus is assisted by the modular nature of the compartment 32 and its contents. Thus a hole may be dug in the ground at the inspection site, along with channels for the influent and effluent ducting (not shown in the drawings). The tank 10 may then be lowered into the hole and its inlet 25 and outlet 27 appropriately connected to the influent and effluent ducting. At a subsequent stage of the installation, the modular unit comprising the compartment 32 and its contents may be lowered into the aperture 26 until the reinforced upper rim 40 of the container 32 comes to rest upon the reinforced inner rim 26 of the top wall 28 of the tank 10. The two rims can then be welded together. The apparatus is then ready for commissioning.

To this end the lower part 12 of the tank 10 may be filled with water to a lower limit for the level of the contents of the tank. Activated sludge is also poured in to the lower half 12 of the container 10. The sludge contains micro-organisms as is well known in the art of sewage treatment, so that details of the constituents of the activated sludge will not be described in detail here.

Figure 3:
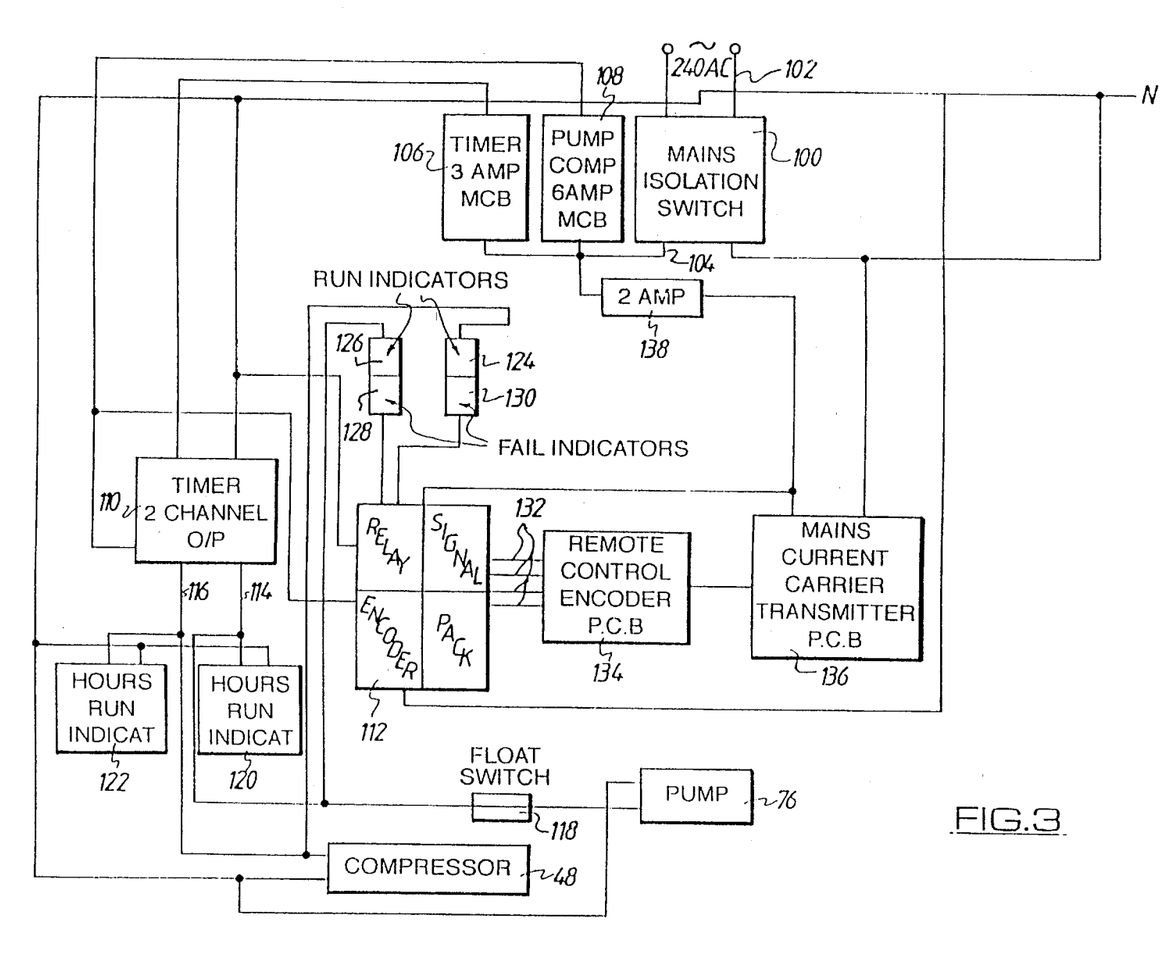
FIG. 3 shows an electrical circuit of the apparatus shown in FIG. 1.

The electrical circuit contained with the control box 80 is shown in FIG. 3. It comprises a 60 amp mains isolation switch 100 connected across a 240 volt mains input 102 which in turn is connected to the mains input lead 82. The positive output terminal 104 of the mains isolation switch 100 is connected to respective inputs of two miniature circuit breakers 106 and 108 allowing a maximum current of 3 amps and 6 amps respectively. The output from the miniature circuit breaker 106 is connected to the input of the timer device 110 and also to an input of the relay signal encoder pack 112. The output from the miniature circuit breaker 108 is connected to a further input of the timer 110 and a second input of the relay signal encoder pack. The first input of the timer 110 is to provide power to operate the timer, and the second input is to provide power to two outputs 114 and 116 in dependence upon operation of the timer 110, to the pump 76 and the compressor 48 respectively. The output 114 is connected to the pump 76 via a float switch 118.

Meters 120 and 122 are connected respectively to the two timer outputs 114 and 116 to provide an indication of the time of operation of the pump 76 and compressor 48 respectively.

The control box 80 is provided with four indicator lamps 124, 126, 128 and 130 to indicate, respectively (a) when the pump 76 is running; (b) when the compressor 48 is running; (c) when the circuit breaker 106 has failed; and (d) when the circuit breaker 108 has failed. To this end, those lamps are connected respectively to the power inputs of the pump 76 and the compressor 48, and also to appropriate outputs of the relay signal encoder pack 112.

To enable the corresponding set of lights at a remote display panel to provide precisely the same indication as is provided at the control box 80, four corresponding further outputs 132 from the four-relay signal encoder pack 112 are connected to respective inputs of a remote control encoder 134. This has an output connected to an input of a mains current carrier transmitter 136 connected to the output 104 of the mains isolation switch via a 2 amp fuse 138 so as to superimpose the encoded signal, in the form of a modulated 125 khz carrier signal, from the encoder 134, upon the electrical potential applied to the mains input 102.

A power supply from the positive terminal 104, via the 2 amp fuse 138, is also provided for the relay signal encoder pack and the remote control encoder 134.

Figure 4:
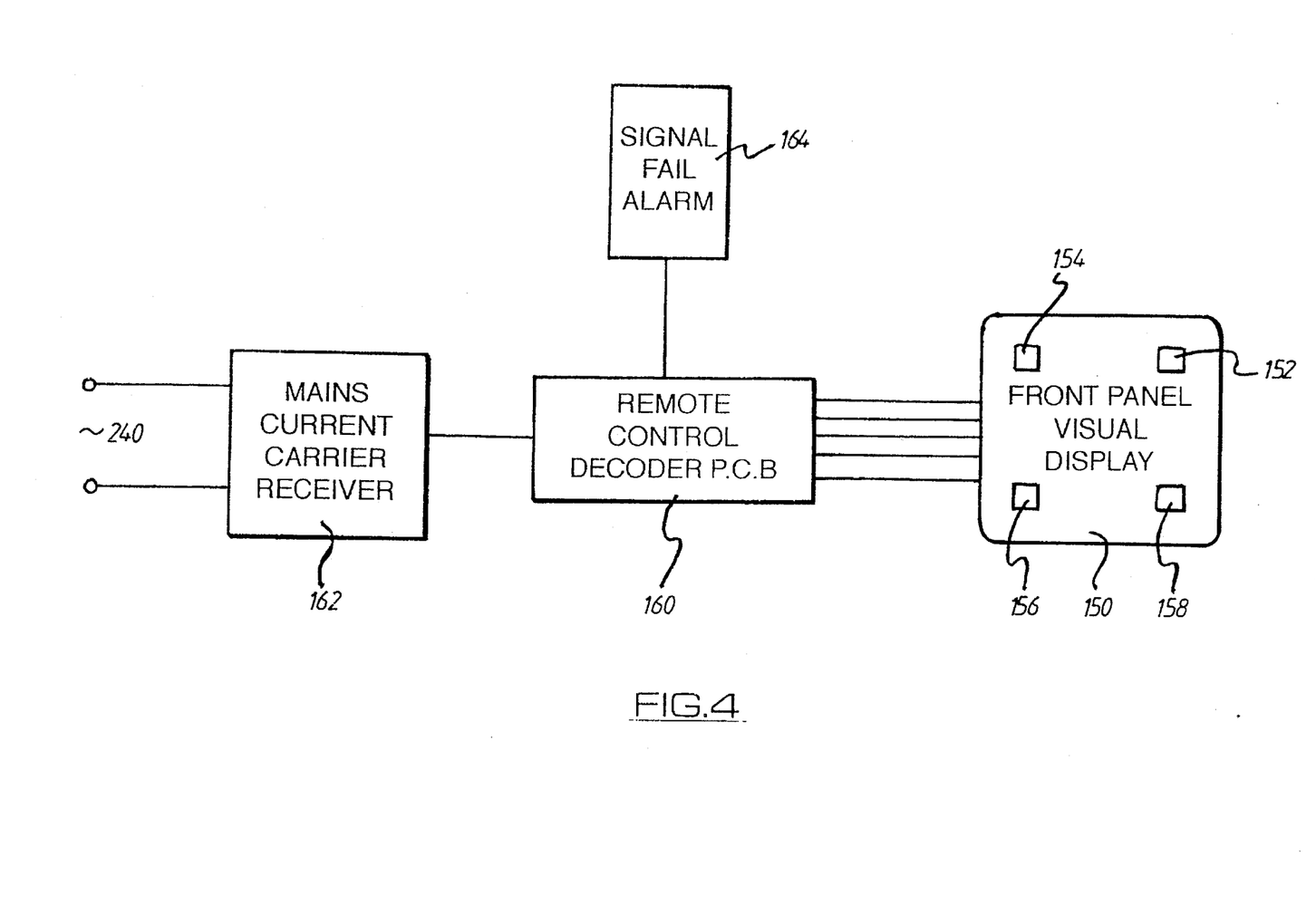
FIG. 4 shows further electrical circuitry which may be connected to the circuit shown in FIG. 3.

With reference to FIG. 4, a visual display panel 150, which is remote from the tank 10, is provided with indicator lamps 152, 154, 156 and 158 corresponding respectively to the indicator lamps 124, 126, 128 and 130 provided on the control box 80. These further lamps are connected respectively to four outputs of a remote control decoder 160 having an input connected to receive the signal which was superimposed on the mains line 102 by the mains current carrier transmitter 106, by means of a mains current carrier receiver 162. Thus the remote control decoder 160 performs the reverse operation to that of the remote control encoder 134.

A signal fault alarm 164 is also connected to the remote control decoder 160 to provide an alarm signal, which may be both visual and audible, in the event that one or other of the miniature circuit breakers 106 and 108 have blown.

To overcome mains interference, the modulated code signal comprises a 9 bit data stream, consisting of 5 bits as an address, and 4 bits as relay data. Each 9-bit signal is repeated, and means are provided in the decoder to compare the two signals, to ensure they agree. Pairs of signals are transmitted about 4500 times per minute, and failure of two received signals to correctly agree during a period exceeding two minutes results in a failure warning being given by the alarm 164. Operation of the apparatus is controlled by the timer 110. This timer is a seven day programmable timer of the general construction such as is found in central heating systems, so that its detailed construction will not be described herein. Suffice it to say that it has maximum of eight on/off functions per day, split between the two channels. Setting of the timer can be effected in block programme mode if desired, so that the switching times for only one day need be entered. The relay outputs 114 and 116 are so wired that the compressor 48 and the pump 76 cannot operate simultaneously.

The lamps 124, 126, 152 and 154 are green, since they show correct operation of the apparatus, and the lamps 128, 130, 156 and 158 are red, because they indicate a failure.

When the timer is on the "on" condition it controls operation of the compressor 48 to provide a normal mode of operation in which aeration occurs for up to eighteen hours per day. The actual amount of air required is calculated by a processor (not shown) within the timer 110 on the basis of cubic meters of air per hour per cubic meter of biomass. When it is in the "off" condition, it controls the compressor 48 to provide aeration for only about three hours per day, corresponding to a sleep or economy mode of operation, to provide the minimum amount of aeration necessary to keep the biomass alive.

It will be appreciated in this respect that the power of the air exiting the aeration diffuser 72 is sufficient not only to aerate the biomass but also to stir it up.

When continued use of the apparatus, through the flow of influent through the inlet 25, causes the level of material contained in the tank to rise to an upper threshold level, as set by the float switch 118, the latter is turned to the "on" condition. Thereafter, the next time the timer 110 switches off the compressor 48 so that it switches power to its output 114, the pump 76 will be turned on to pump out effluent through the outlet 27 until the contents of the tank 10 reaches a lower level also defined by the float switch, whereupon the latter switches to an "off" condition to switch off the pump 76. This ensures that enough of the biomass remains to keep it alive.

The apparatus thereby operates as a batch system for the treatment of sewage.

In the event that the float switch remains in the "off" condition for a period exceeding twenty four hours, an electrical or electronic switch (not shown) will switch operation to the sleep or economy mode. Thereafter, when the float switch reverts back to the "on" condition, as a result of further inflow of influent, the switch puts the operation back into normal mode, overiding the timer 110 until a full aeration programme has elapsed, to ensure that the effluent will not contain untreated material.

It has been found that the apparatus produces an effluent in the form of a calcified humus which may be used as a granular compost. The concentration of pollutant in the effluent for a typical United Kingdom influent is of the order of 12 grams per liter of biological oxygen demand material, 17 grams per liter of suspended solids, and 6 grams per liter of combined phosphates and nitrates. This corresponds to a reduction in these pollutants of about 98% of biological oxygen demand material, 98% of suspended solids and 75% of combined phosphates and nitrates.

Servicing for the apparatus is typically required every 11,000 to 15,000 hours of operation. It is facilitated by removal of the servicing cover 36, and sliding out the panel 42 with the compressor 48 and the control box 80. In order to slide the panel clear of the rim 48 of the compartment 32, it may be necessary first to rotate the panel 42 a little before it is completely removed. This may be achieved by the provision of slots or recesses in the sides of the panel 42 to enable them to be swung clear of the studs 46.

Any replacement of the compressor vanes or turbine blades may be then effected without difficulty. If necessary, the gas-tight removable floor 34 may be removed and a suction lance (not shown) inserted into the tank interior to remove the build-up of solids, whilst leaving enough of those solids to keep the biomass alive. The lance that is inserted in this way has a jet on one end to stir up solids, and a suction inlet halfway up it for the removal of the sludge, so that insertion of the lance down to the bottom of the tank, whilst holding the lance in a substantially vertical position, ensures that a correct amount of sludge is removed (about two thirds).

Thus the ease with which the apparatus can be serviced, as a result of the modular nature of the compartment 32 and its contents, will be apparent to those familiar with the art of sewage treatment.

Figure 5:
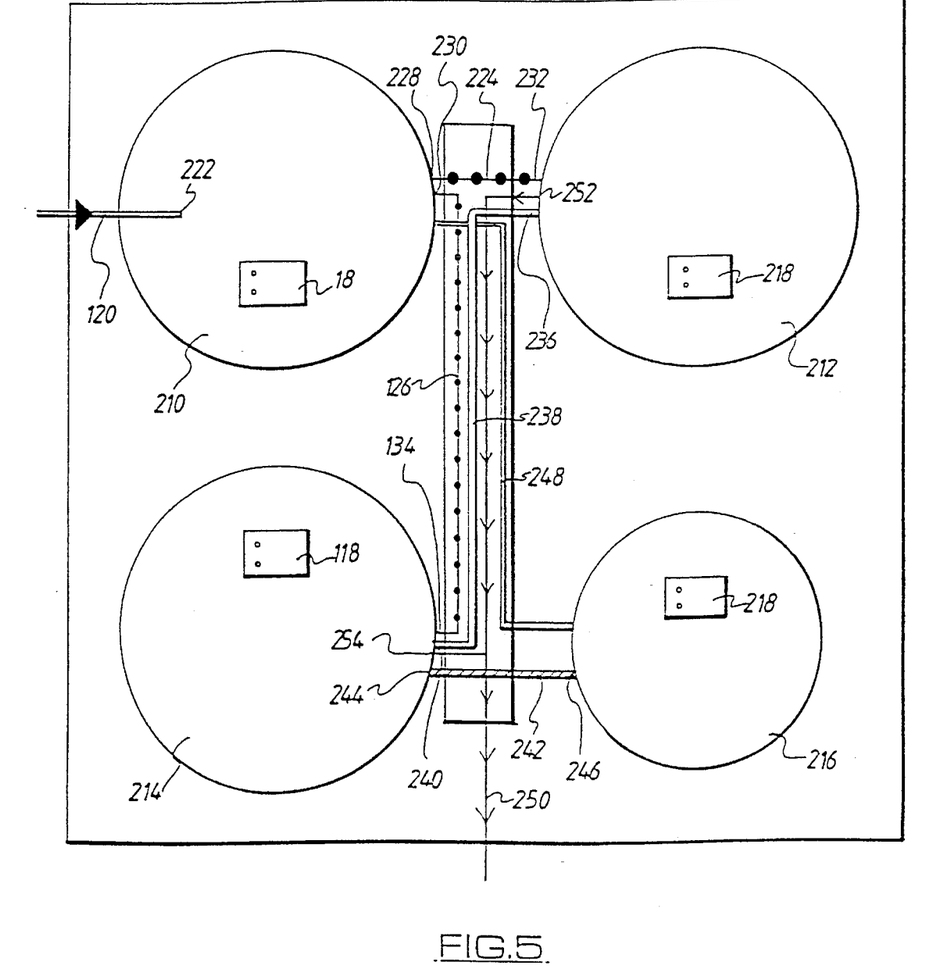
FIG. 5 is a diagrammatic plan view of further such apparatus.

The sewage treatment apparatus shown in FIG. 5 comprises a holding tank 210, a first working tank 212, a second working tank 214, and a concentrator tank 216. Each tank is provided with its own electrical control 218, to be described in greater detail herein.

The four illustrated tanks 210 to 216 are arranged generally on the corners of an imaginary square.

An influent pipe 220 is connected to an influent inlet 220 of the holding tank 210, to feed influent to that tank. The outlet 222 is provided with a rotary screen filter (not shown).

The manner in which the four tanks are connected between themselves is as follows: two influent feed pipes 224 and 226 extend between respective influent outlets 228 and 230 of the holding tank 210 to respective influent inlets 232 and 234 of the working tanks 212 and 214. A biomass outlet 236 of the working tank 212 is connected via a biomass feed pipe 238 to a biomass inlet 240 of the second working tank 214. A further biomass feed pipe 242 connects a biomass outlet 244 of the second working tank 214 to a biomass inlet 246 of the concentrator tank 216. Water drains from the consolidator tank 216 by the action of gravity and is returned to the holding tank 210 via a water return pipe 248. Finally, a common treated water outlet pipe 250 is connected to respective treated water outlets 252 and 254 of the working tanks 212 and 214.

Figure 6:
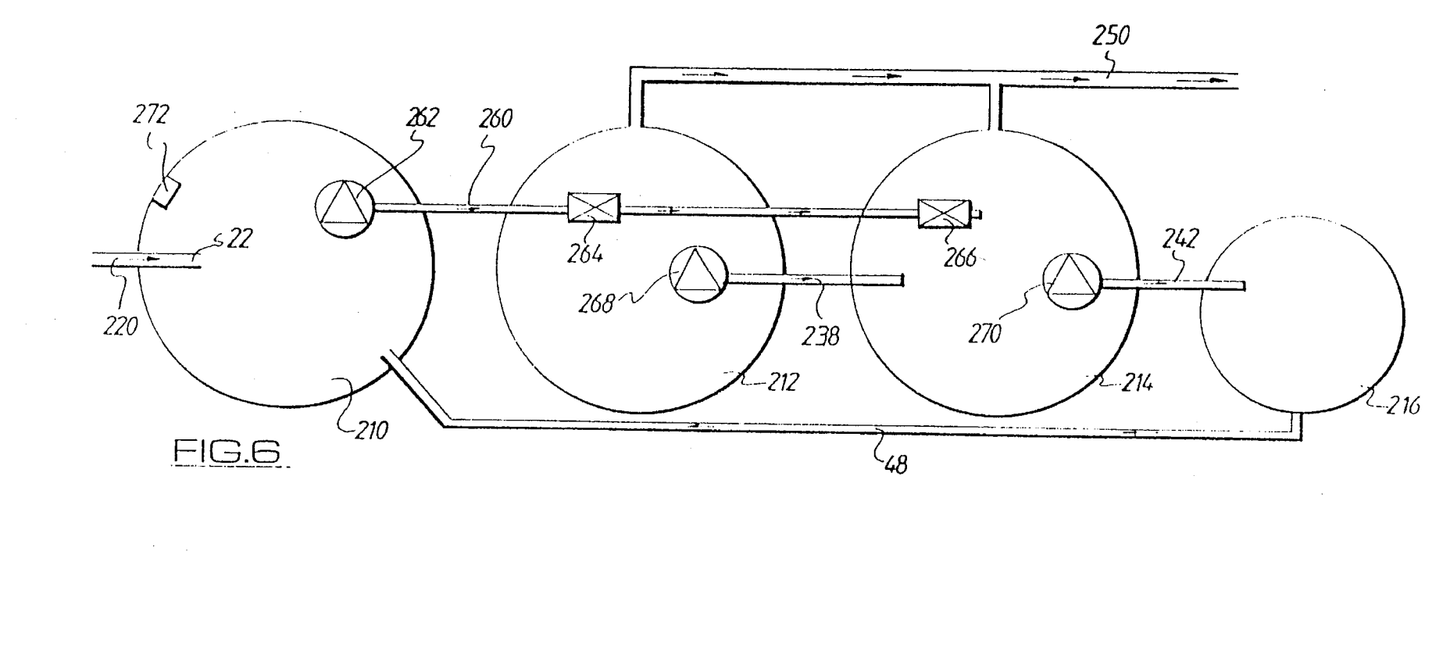
FIG. 6 is a diagrammatic plan view of a modified configuration of the apparatus shown in FIG. 5.

A slightly modified arrangment is shown in FIG. 6. In this arrangement, the four tanks are arranged in a linear array. In this Figure, parts which correspond to those of FIG. 5 have been given the same reference numbers as used in FIG. 5. The manner in which the tanks are interconnected differs slightly from the FIG. 5 arrangement at least in so far as the two influent feed pipes 224 and 226 are replaced by a single common feed pipe 260, with a chopper pump 262 at the outlet from the holding tank to feed influent into the common feed pipe 260. The feed pipe 260 is connected to the working tanks 212 and 214 via respective motorised shut-off valves 264 and 266.

FIG. 6 also shows that the upstream ends of the biomass feed pipes 238 and 242 are connected to be fed by respective sludge pumps 268 and 270 in the working tanks 212 and 214 respectively.

The holding tank 210 is provided with a level sensor 272 which is arranged to be triggered when the level of influent in the holding tank 210 reaches a predetermined level.

Figure 7:
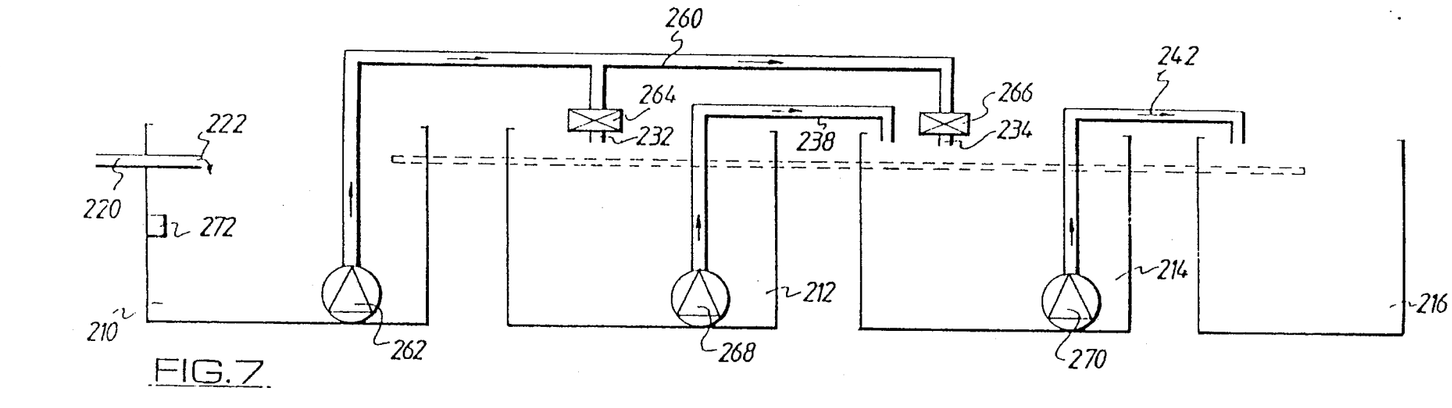
FIG. 7 is a diagrammatic elevational view of the apparatus shown in FIG. 6.

The relative vertical positions of the parts shown in FIG. 6 is more readily ascertained from FIG. 7. This shows in particular that the chopper pump 262 and the two sludge pumps 268 and 270 are low down in the tanks 210, 212 and 214 respectively, to ensure that they each receive contents of the tank from a low level thereof. However, the sludge pumps 268 and 270 are spaced from the bottoms of the tanks 212 and 214 to ensure that some of the active biomass will always remain in these tanks.

In contrast, the influent inlets 232 and 234 to the working tanks 212 and 214 are at a relatively high level.

Figure 8:
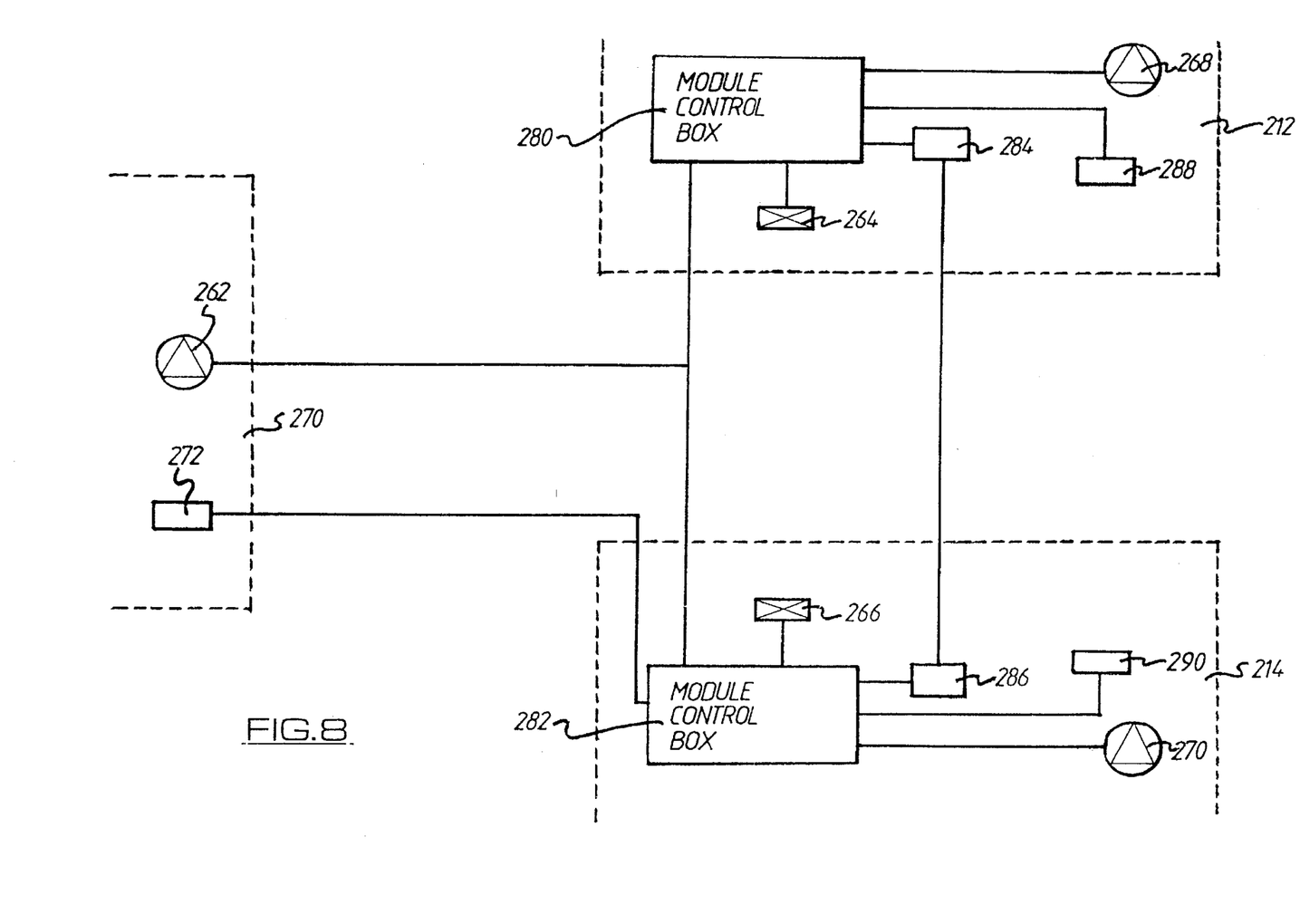
FIG. 8 shows electrical control circuitry of the apparatus in FIG. 5 or FIG. 6.

The electrical control circuitry for the parts is shown in FIG. 8. The two working tanks 212 and 214 are provided with respective module control boxes 280 and 282. These are interconnected by way of respective latch switches 284 and 286, and to each module control box 280 there is connected the associated sludge pump 268 or 270, a tank level sensor 288 or 290, and the associated motorised valve 292 and 294. In addition, the level sensor 272 of the holding tank 210 is electrically connected to the module control box 282 of the tank 214, and the chopper pump 262 of the holding tank 210 is connected to both module control boxes 280 and 282.

It will be appreciated that each working tank 212 and 214 is constructed in the same way, and operates in the same way as the sewage treatment apparatus illustrated in and described with reference to FIGS. 1 and 2 above. Thus, each tank when filled has its level sensor 288 or 290 triggered to stop the filling process. Aeration proceeds after the last pump out of the tank contents, and continues with timed breaks to reduce the Nitrogen content. A settlement process follows, and then pump out of one fifth of the tank capacity. Pump out lasts for about fifteen minutes. Filling is resumed whilst aeration is prevented. Three such cycles occur every twenty four hours.

The apparatus illustrated in FIGS. 5 to 10 operates in the following manner.

Influent from the feed pipe 220 flows into the holding tank 210 and is transferred therefrom, via the chopper pump 262 and the influent feed pipe 260, to the working tank 212 via the motorised valve 264. Provided the amount of influent flowing into the holding tank over a given period does not exceed the amount of influent which can be properly treated by the tank 212 over that same period, the level of the influent in the holding tank will not reach the level sensor 272. However, directly the level at which the level sensor 272 is triggered is exceeded, the output signal from the level sensor 272 is received by the module control box 282 to operate the motorised valve 266 of the working tank 214, such that the latter now fills. Therefore, during the period in which the rate at which influent is fed to the holding tank 210 over a given period exceeds that which the working tank 212 can cope with, both working tanks 212 and 214 will be brought into operation. During this time, their control boxes will ensure they work at staggered times. The control box 280 of working tank 212 energises the latch switches 284 and 286 of both tanks, as a result of which the sludge pump of each tank will operate for a predetermined amount of time after a pump-out from that tank, the pump out being as described in detail with reference to FIGS. 1 to 4 above, and before aeration of that tank commences.

However, when that input is not exceeded so that for a given period of time the influent in the holding tank 210 never reaches the level sensor 272, only the working tank 212 will be used to treat the influent. Over this period which might be for as long as six months in the event that, for example, the influent being treated is from a group of holiday chalets, the working tank 214 will not be used, and it will therefore operate in the sleep mode, in which aeration within the tank occurs for only about three hours per day. To keep the biomass sufficiently active over such a prolonged period, and to reduce the risk of excessive pollution in the materials ejected from tank 214 upon start up of full use of that tank, the module control box 282 connects the sludge pump 270 to be operated simulanteously with the sludge pump 268. Furthermore, biomass from the working tank 212 will be pumped in to the working tank 214 at regular intervals under the control of the module control box 280. For that purpose, the control box 280 may include a timer (not shown) to cause such pumping to occur once for about five minutes every twenty-four hours. At the same time, therefore, biomass from the working tank 214 will be pumped out by the sludge pump 270 to the concentrator tank 260, so that the amount of biomass in the working tank 214 will remain substantially the same, so that the working tank 214 will remain in sleep mode. At the same time, however, it will receive fresh supplies on a regular basis of living microorganisms from the working tank 212, to keep the biomass in the tank 214 sufficiently alive over such a prolonged period.

Water from the concentrator tank 216 is returned to the holding tank 210 via the water return pipe 248. At regular intervals, the solids in the form of odourless calcified humus, are removed from the concentrator tank 216. These intervals are clearly much greater than the intervals at which an individual tank would need desludging if it were installed on its own.

The manner in which operation of the system is monitored uses the same technique as is described above in relation to FIGS. 1 to 4.

Figure 9:
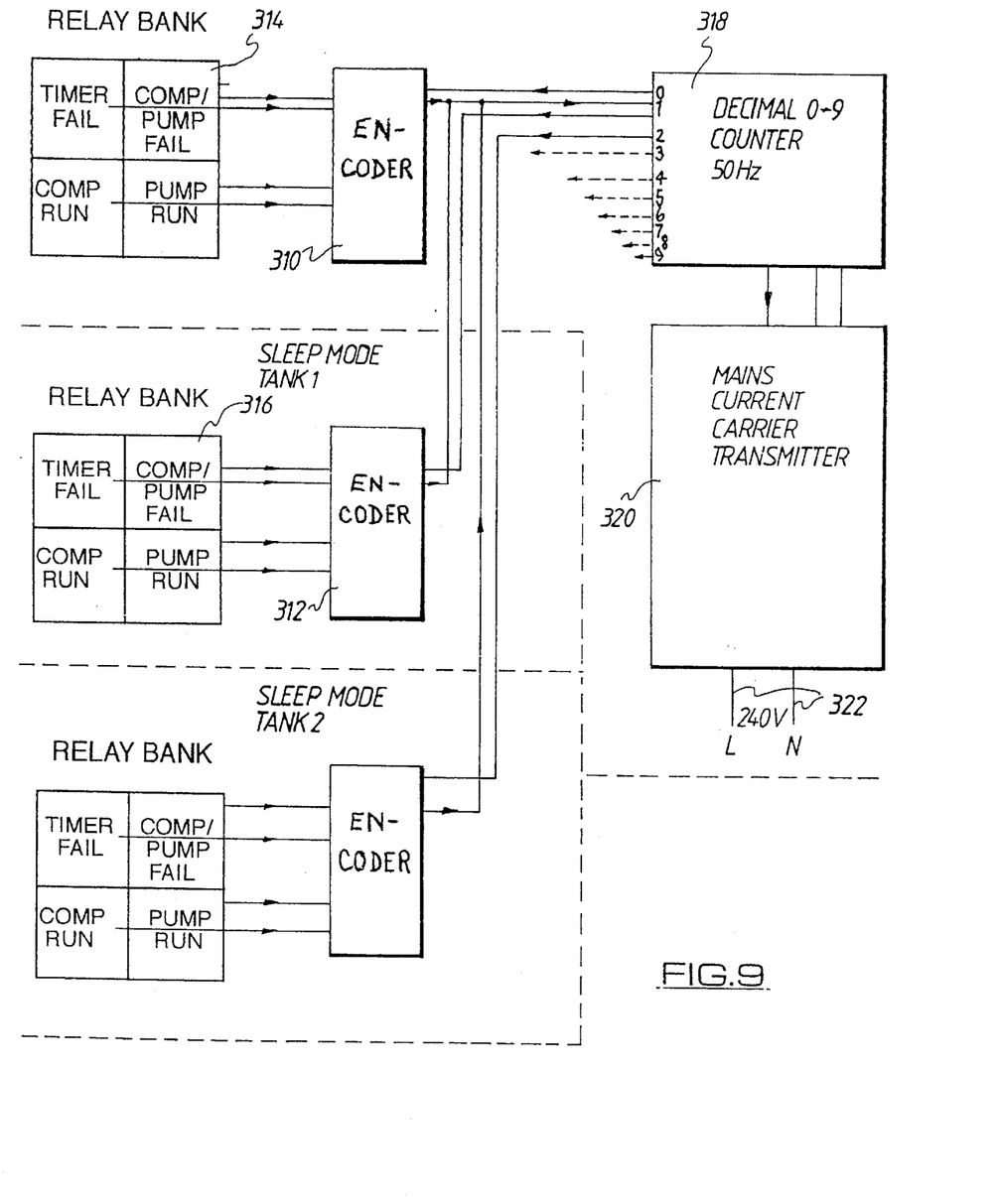
FIG. 9 shows encoding monitoring electrical circuitry of the apparatus shown in FIG. 5 or FIG. 6.

Thus, the states of the relays (not shown in FIGS. 5 to 8 which supply power to the various power-consuming devices of the apparatus (such as the chopper pump, the sludge pumps, the effluent pumps (not shown) and the compressors (not shown)) are converted to a digital signal by means of encoders 310 and 312, which receive signals from the relay banks 314 and 316 of the two tanks and forward these signals to a decimal counter 318. The latter sends enabling signals successively from its enabling outputs connected respectively to enabling inputs of the encoders.

An output from the counter 318 is connected to the mains current carrier transmitter 320 which superimposes the digital signals from the counter 318 on to the mains lines 322 which supply power to the power-consuming components of the apparatus.

Figure 10:
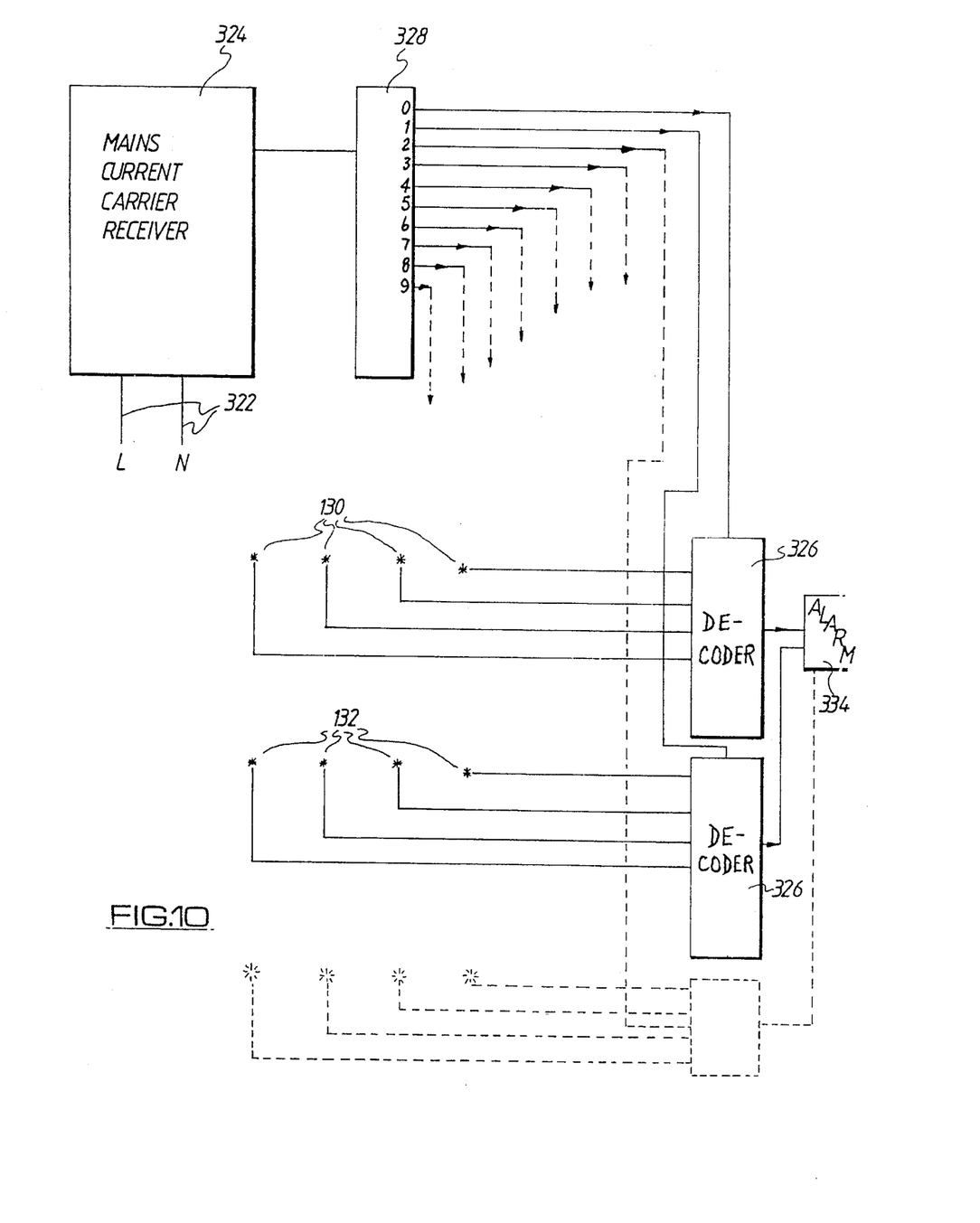
FIG. 10 shows decoding monitoring electrical circuitry of the apparatus shown in FIG. 5 or FIG. 6.

At a position remote from the treatment apparatus, a mains current carrier receiver 324 is connected to the mains lines 322 which supply power to the power-consuming components of the sewage treatment apparatus. The digital signals received from the different tanks are distributed to respective decoders 326 via an interface 328. The decoders 326 are connected to display drives of visual displays 330 and 332 to provide a visual image of the states of the various relays of the relay banks 314 and 316. The decoders 326 are also connected to an alarm 334 to trigger the latter in the event that one of the relays of the relay banks 314 and 316, has failed.

It will be appreciated that more than two working tanks can be provided in the apparatus, in which case they will all be connected to the common influent pipe 260 and the common treated water output pipe 250, and the sludge pipes will connect the working tanks in cascade fashion, in the same order as that of the level sensors in the holding tank with which the working tanks are associated. Thus, if the tank which is filled when the influent in the holding tank has not reached the lowermost level sensor in the working tank is called the first tank, the working tank which is filled when the first level sensor is reached is called the second tank, the working tank which is filled when the second lowest level sensor in the holding tank is reached is called the third tank, and so on, then the most upstream of the sludge pipes in the cascade will connect the first and second tanks to feed sludge from the first tank to the second tank, by means of the sludge pump in the first tank, then a second sludge pipe will connect the second working tank to feed sludge to the third working tank by means of the sludge pump in the second working tank, and so on, until the most downstream tank will have its sludge pump connected to feed sludge to the concentrator tank.

It is believed to be evident how the electrical control circuitry shown in FIG. 8, and also the electrical monitoring circuitry shown in FIGS. 9 and 10 are adapted to cater for sewage treatment apparatus having more than two working tanks.

Numerous variations and modifications to the illustrated sewage treatment apparatus will readily occur to a person of ordinary skill in the art without taking the apparatus outside the scope of the present invention. For example, the compartment 32 may be extended so that it constitutes the upper half of the tank 10.

It has in fact been found that for most applications the gas-tight inspection hatch 98 is unnecessary.

A Lithium battery back-up may be provided against possible mains failure. A memory may also be accordingly provided to store the clock settings, so that the correct operation of the apparatus may be resumed when power returns.

Whilst each working tank illustrated in FIGS. 5 to 7 is stated to be as described in FIGS. 1 to 4 above, each working tank may be of any construction requiring living microorganisms to treat influent. The holding tank 210 in the FIG. 5 arrangement may have two chopper pumps, one for each influent pipe 224 and 226. The holding tank 210 may also be provided with an agitator phosphate sensor dosing unit (not shown).

The concentrator tank 216 may be provided with its own aerator and timing module.

The tanks may be installed on two concrete rafts, so that they are totally above the ground, or so that their tops are flush with the ground.

If one working tank should fail, the other or others will continue independently of the failed tank.

The tanks may be in two rows spaced by about one meter.

The interconnecting pipes and electrical lines may be recessed in ducting beneath the ground.

Status indication for each tank may be provided to indicate the status of the progress reached by each tank.

Timers may be fitted to all working motors to indicate service periods and locating levels and throughput.

A vented module (not shown) may be provided to house all contactors and starters.

The apparatus may be readily adaptable so that an additional working tank may be incorporated into existing apparatus.

Energy consumption is kept low by ensuring that all working tanks which are not needed over any given period are left in sleep mode by failure to pass influent to them from the holding tank.

The holding tank may be vented through one of the working tanks to minimise foul smells.

I claim:

1. Sewage treatment apparatus comprising a tank, aeration means which serve to aerate a biomass contained within the tank when the apparatus is in use, and air compressor means which are connected to the aeration means to deliver air thereto, in which the air compressor means are in a housing that forms a barrier between the housing interior and the tank interior, to inhibit transfer of gas or other material from the tank interior to the housing interior, in which the tank has a top wall with an inner rim, in which the said housing is modular end has an upper outer rim and a service cover, and in which the housing is located within the tank with the said upper outer rim of the housing engaging the said inner rim of the top wall of the tank, whereby, when the apparatus is installed for use, the said housing is lowered into the tank until the said upper outer rim engages the said inner rim.

2. Sewage treatment apparatus according to claim 1, in which the compressor is mounted on a separate panel which is located with the said housing and which is readily removable for the said housing for ease of servicing.

3. Sewage treatment apparatus according to claim 2, in which the said separate panel has edges which slidingly engage formations within the said housing.

4. Sewage treatment apparatus according to claim 3 in which the said formations are in the form of studs or other projecting portions projecting from one or more interior walls of the said housing.

5. Sewage treatment apparatus according to claim 4, in which slots or recesses are formed in an edge of the said separate panel to enable the latter to be swung clear of the said projecting portions after the panel has been slightly raised.

6. Sewage treatment apparatus according to claim 2, in which connecting lines between parts mounted on the said separate panel and other parts within the said housing are ducted through an umbilical cord to enable the said separate panel to be removed from the said housing without those lines being disconnected.

7. Sewage treatment apparatus according to claim 2, in which an electrical control unit is also mounted on the said separate panel.

* * * * *